United States Patent
Deivasigamani et al.

(10) Patent No.: US 9,568,212 B2
(45) Date of Patent: Feb. 14, 2017

(54) COIL TUBE HEAT EXCHANGER FOR A TANKLESS HOT WATER SYSTEM

(71) Applicants: Sridhar Deivasigamani, Peoria, IL (US); Sivaprasad Akasam, Peoria, IL (US)

(72) Inventors: Sridhar Deivasigamani, Peoria, IL (US); Sivaprasad Akasam, Peoria, IL (US)

(73) Assignee: Intellihot Green Technologies, Inc., Galesburg, IL (US)

(*) Notice: Subject to any disclaimer, the term of this patent is extended or adjusted under 35 U.S.C. 154(b) by 365 days.

(21) Appl. No.: 14/151,889

(22) Filed: Jan. 10, 2014

(65) Prior Publication Data
US 2014/0124180 A1    May 8, 2014

Related U.S. Application Data

(63) Continuation of application No. 12/858,101, filed on Aug. 17, 2010, now Pat. No. 8,656,867.
(Continued)

(51) Int. Cl.
*F24H 1/16* (2006.01)
*F24H 1/18* (2006.01)
(Continued)

(52) U.S. Cl.
CPC .............. *F24H 1/165* (2013.01); *F24H 1/186* (2013.01); *F24H 1/208* (2013.01); *F24H 1/34* (2013.01); *F24H 1/43* (2013.01); *F24H 1/44* (2013.01); *F24H 9/0026* (2013.01); *F24H 9/1836* (2013.01); *F28D 1/0472* (2013.01); *F28D 7/024* (2013.01); *F28F 1/24* (2013.01); *F28F 1/36* (2013.01); *F28F 13/06* (2013.01);
(Continued)

(58) Field of Classification Search
CPC ............ F24H 1/165; F24H 1/186; F24H 1/43; F28D 1/0472
USPC ............... 122/18.4, 18.1, 15.1; 277/602, 603
See application file for complete search history.

(56) References Cited

U.S. PATENT DOCUMENTS 2,074,974 A  *  3/1937  Stewart .................... C03B 29/02
                                                    432/1
5,311,843 A  *  5/1994  Stuart ....................... F24H 1/43
                                                    122/18.4
(Continued)

OTHER PUBLICATIONS http://www.mcmaster.com/#high-temperature-seals/=oot7pf, McMaster-Carr Product Listing.

*Primary Examiner* — Steven B McAllister
*Assistant Examiner* — Ko-Wei Lin
(74) *Attorney, Agent, or Firm* — Tracy Jong Law Firm; Tracy P. Jong; Cheng Ning Jong

(57) ABSTRACT

A heat exchanger having a helix coil incorporated into a stainless steel elongated variable diameter cylindrical housing and a radial direct-firing burner and a blower-driven hot flue gas to heat water. A buffer tank is incorporated within the lumen of the helix coil. At least one rope seal is disposed between adjacent coil loops of a portion of the helix coil for enhancing heat transfer to the helix coil. In one embodiment, the heat exchanger further comprises a Stirling engine comprised of a free piston having hot and cold ends that is disposed within the cavity taken up the buffer tank, wherein the hot end receives heat from the burner and the cold end is cooled by the incoming cold water line to form an electric power generator.

9 Claims, 11 Drawing Sheets

Related U.S. Application Data

(60) Provisional application No. 61/234,710, filed on Aug. 18, 2009.

(51) Int. Cl.

| | |
|---|---|
| *F24H 1/20* | (2006.01) |
| *F24H 1/34* | (2006.01) |
| *F24H 1/43* | (2006.01) |
| *F24H 9/00* | (2006.01) |
| *F24H 9/18* | (2006.01) |
| *F28D 7/02* | (2006.01) |
| *F28F 1/24* | (2006.01) |
| *F28F 13/06* | (2006.01) |
| *F28D 1/047* | (2006.01) |
| *F28F 1/36* | (2006.01) |
| *F24H 1/44* | (2006.01) |
| *F28F 9/02* | (2006.01) |

(52) U.S. Cl.
CPC ...... *F24D 2200/08* (2013.01); *F24D 2200/14* (2013.01); *F24D 2200/26* (2013.01); *F24H 2240/04* (2013.01); *F28F 2009/0292* (2013.01); *F28F 2215/04* (2013.01); *F28F 2255/14* (2013.01); *F28F 2265/12* (2013.01); *Y02B 10/20* (2013.01); *Y02B 10/70* (2013.01)

(56) References Cited

U.S. PATENT DOCUMENTS

| | | | | |
|---|---|---|---|---|
| 5,415,440 A | * | 5/1995 | Kanao | F16L 13/11 264/171.27 |
| 6,810,836 B1 | * | 11/2004 | Ferguson | F24H 1/40 122/249 |
| 7,281,497 B2 | * | 10/2007 | Le Mer | F24H 1/43 122/18.1 |
| 2006/0258911 A1 | * | 11/2006 | Sato | A61B 1/00071 600/139 |
| 2009/0184516 A1 | * | 7/2009 | Schneider | F16B 7/182 285/355 |

\* cited by examiner

COIL TUBE HEAT EXCHANGER FOR A TANKLESS HOT WATER SYSTEM

PRIORITY CLAIM AND RELATED APPLICATIONS

This continuation application claims the benefit of priority from provisional application U.S. Ser. No. 61/234,710 filed Aug. 18, 2009 and U.S. Ser. No. 12/858,101 filed Aug. 17, 2010. Each of said applications is incorporated by reference in its entirety.

BACKGROUND OF THE INVENTION

1. The Field of the Invention

The present invention is directed generally to heat exchangers, and more particularly, to a coil tube heat exchanger for a tankless hot water system.

2. Background Art

In a tankless hot water system, a buffer tank is typically used as a limited energy storage device to meet sudden high hot water demand and to lessen the effects of temperature spike. In prior art tankless hot water systems having at least a fin-and-tube heat exchanger, a separate storage device is commonly used as the buffer tank and disposed externally from the fin-and-tube heat exchanger. The fin-and-tube heat exchanger comprises a generally cylindrical housing, a helix coil disposed concentrically inside the housing, a radial-fired burner disposed inside the coil lumen on one end of the helix coil and a ceramic disc disposed inside the helix coil lumen on the opposite end of the helix coil. Typically a top casting fixedly disposed on top of the housing serves as an interface between a fan blower which forces an air/fuel mixture flow to the burner. The ceramic disc serves as a barrier to shield hot flue gas from damaging components in its path and to channel hot flue gas to more effectively surround the helix coil external surfaces to improve heat transfer from flue gas to the water flowing inside the helix coil. However, the use of a ceramic disc inside the lumen takes up valuable heat exchanger footprint, increases fabrication and installation costs and fails to harness and recover the maximum amount of energy. In such installations, typically fluid baffle plates are used and positioned between coil windings (loops) such that hot flue gas can be more efficiently directed around coil tube. Though effective in enhancing heat transfer from the hot flue gas to the helix coil, there remain gaps in the path of the hot flue gas to escape through. Poor heat recovery through the top casting further causes an unnecessarily warm top casting, waste to the environment and unnecessarily heats up surrounding components.

SUMMARY OF THE INVENTION

To overcome the limitations of the prior art, there is provided a novel and previously unknown heat exchanger for a tankless hot water system. The novel heat exchanger comprises a helix coil having an inlet port and an outlet port that is concentrically disposed within a stainless steel generally cylindrical variable diameter housing that is positioned upright. Fins are disposed externally over the entire length of the helix coil. In one embodiment, fins are disposed at variable fin density across at least a portion of the length of the helix coil for reducing the unevenness of the hot flue gas distribution.

Fin density is defined as the number of fins per unit helix coil length. A radial direct-fired burner is disposed within a top portion of the helix coil lumen while a generally cylindrical buffer tank is disposed within a bottom portion of the helix coil lumen. The burner is generally cylindrical and comprises an open upper end, a closed lower end and a cylindrical wall connecting the open upper end and the closed lower end, wherein the cylindrical wall comprises a plurality of regularly spaced apart apertures.

A top casting fixedly connects the burner to the housing while providing a path for air/fuel mixture to enter the burner as well as enabling excess heat removal from the top casting. The fuel includes, but not limited to natural gas and propane. The top casting is securely attached to an upper opening of the housing. Air/fuel mixture under pressure of a fan blower is supplied via an inlet port of the top casting and directed downwardly towards the radial direct-fired burner to be combusted. There is further provided at least one rope seal for further enhancing heat transfer from the hot flue gas to incoming cold water and integrity of helix coil installation within the housing. A rope seal is disposed between at least two helix coil loops to direct hot flue gas in a direction substantially circumferencing the outer perimeter of a helix coil tube.

In use, incoming cold water is supplied through the inlet port of the helix coil, receiving heat first primarily from the hot flue gas flowing through the space between the cylindrical inner surface of the housing and the cylindrical outer surface of the buffer tank and then energy from the radiant heat provided by the burner before exiting via the exit port of the helix coil. The buffer tank is a generally cylindrical tank having a top end wall, a bottom end wall and a cylindrical wall connected to the top end and bottom end walls. An outlet tube having an opening is disposed substantially centrally on the bottom end wall while an inlet port is disposed away from the center of the bottom end wall. The outlet tube extends through the bottom end wall from outside the buffer tank and terminates with the opening of the outlet tube substantially disposed at the top end wall. As heated water exits via the exit port of the helix coil and enters the inlet tube of the buffer tank, it continues to receive heat within the buffer tank which receives heat from the hot flue gas primarily and radiant heat from the burner secondarily. The need for a ceramic disc insulator for preventing overheating in components in the path of the hot flue gas and insulation around the buffer tank is therefore eliminated. The top end wall is a cone shaped surface to deflect condensation which can otherwise collect on this surface. The lower end of the burner is a substantially flat surface devoid of flame enabling elements. As such, the portion of the buffer tank immediately underneath the lower end of the burner is not exposed to direct flame so that localized boiling does not occur.

There is further provided a novel port fitting which eliminates the need for spacing the winding (loop) of the helix coil on which the inlet port or the outlet port of the helix coil is disposed.

In one embodiment, an expansion bladder is disposed inside the buffer tank. This expansion bladder performs the function of and eliminates the need of an external expansion tank.

In one embodiment of the present invention, a Stirling engine having a hot end and a cold end is disposed within the cavity configured for the buffer tank. In this embodiment, in addition to generating hot water, the heat exchanger is capable of producing electricity.

It is an object of the present invention to provide a compact space saving heat exchanger design.

It is an object of the present invention to provide a buffer tank that does not require external insulation.

It is an object of the present invention to provide a heat exchanger that eliminates the need for a ceramic disc insulator.

It is an object of the present invention to provide a buffer tank that captures and prevents the loss of radiant heat from the burner and convective heat from the hot flue gas but instead recovers the heat for heating the water in the buffer tank.

It is an object of the present invention to prevent uneven hot flue gas distribution.

It is an object of the present invention to provide a heat exchanger design without excessively strict tolerances that are difficult and costly to manufacture.

It is an object of the present invention to provide greater transfer of heat from the fin surfaces and increase the hot flue gas flow over the fins of the helix coil.

It is an object of the present invention to prevent overheating of the top casting.

It is an object of the present invention to provide a buffer tank that prevents condensate puddling and corrosion.

It is an object of the present invention to provide a buffer tank that prevents localized boiling.

It is an object of the present invention to provide a buffer tank that is completely filled at substantially all times during operation.

It is an object of the present invention to provide a buffer tank that provides excellent mixing, minimizes temperature fluctuations and eliminates cold water sandwiches.

It is an object of the present invention to provide a buffer tank that uses buffer tank walls for convective heat transfer.

Still another feature of the heat exchanger of this invention is that it requires no external expansion tank.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1B:
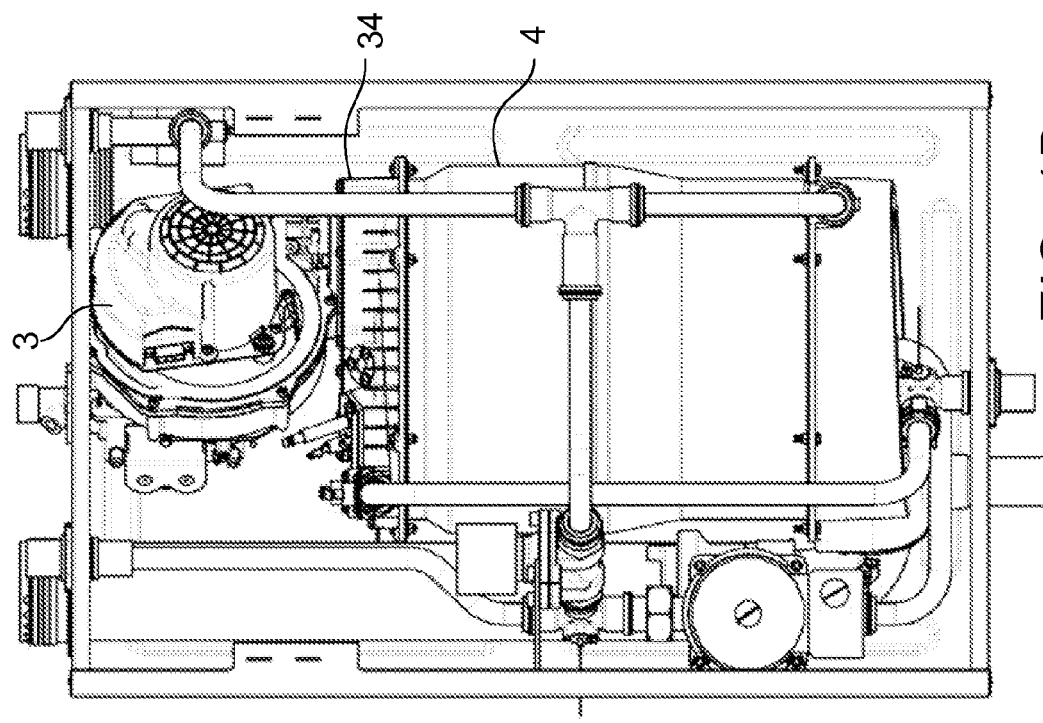
FIG. 1B is a front orthogonal view of the hot water system of FIG. 1A.

The drawings are not to scale, in fact, some aspects have been emphasized for a better illustration and understanding of the written description.

PARTS LIST

2—hot water system
3—fan blower
4—heat exchanger
6—buffer tank inlet port
7—alternate buffer tank inlet port
8—buffer tank outlet tube
10—igniter
12—top end wall
13—bottom end wall
14—radial-fired burner
16—direction of hot flue gas
18—finned helix coil
19—helix coil tube
20—heat exchanger housing
22—section of heat exchanger housing with increased diameter
23—section of heat exchanger housing with normal diameter
24—gap between helix coil loops
26—hot flue gas flow between coil loops
27—flue baffle plate
28—hot flue gas deflector
29—apertures
30—rope seal
31—water flow
32—buffer tank
33—central longitudinal axis of buffer tank
34—top casting
35—thermal insulator
36—exit port of top casting
37—input port of top casting
38—direction of hot flue gas flow between coil loops as enhanced by rope seal
38A—undeflected hot flue gas flow
39—direction of hot flue gas flow as deflected by hot flue gas deflector
40—expansion bladder
41A—gap between heat exchanger housing and helix coil
41B—gap between helix coil and buffer tank 42—electric heating system
43—electric heating element
44—solar heat tubing
46—solar heat exchanger
48—solar energy
50—solar energy collector
52—pump
54—heat radiating fins
56—fluid path diverters
57—wedge
58—air/fuel mixture flow path
58a—air/fuel mixture flow path upon splitting off due to impact with wedge 57
60—helix coil lumen
62—helix coil inlet port
64—helix coil outlet port
66—fins
68—first section of helix coil, i.e. section that surrounds the burner
70—second section of helix coil, i.e. section that surrounds the buffer tank
72—port fitting
74—O-ring
75—circumferential groove
77—circumferential securing flange
78—helix coil exit port lumen
79—external tubing
80—Stirling engine
82—incoming cold water line
84—outgoing heated water line
86—electric power electronics
88—utility or home power grid
90—cold end of Stirling engine
92—hot end of Stirling engine
94—flow chamber
96—forced incoming ambient air
98—fuel
100—air/fuel mixture
110—combined heat and electric power system
112—improved combined heat and electric power system
114—bend angle between helix coil end loop and its adjacent helix coil loop
116—external fitting
118—prior art helix coil
120—bend between finned helix coil end loop and its adjacent finned helix coil loop
122—end coil loop

PARTICULAR ADVANTAGES OF THE INVENTION

A buffer tank is disposed in the cavity of the heat exchanger housing conventionally taken up by a ceramic disc and it replaces the functions provided the ceramic disc. In addition, by incorporating a buffer tank, more energy that would have been wasted can be recovered. Furthermore, the buffer tank does not require insulation because it is disposed in the lumen of the heat exchanger helix coil where it is inherently insulated from ambient air that can lower the water temperature inside the buffer tank. In addition, radiant heat from the burner and convective heat from the hot flue gas is effectively captured by the buffer tank. Excessive heat from the burner that can potentially damage the buffer tank is absorbed by the body of water inside the buffer tank. Placement of the buffer tank inside the helix coil lumen eliminates the need for extra space for situating the buffer tank in a hot water system, resulting in a smaller and more compact water heater package. The need for a ceramic disc and insulation around the buffer tank is eliminated, realizing cost savings, lower energy usage, fewer parts and ease of maintenance and repair.

By providing an expansion bladder in the buffer tank, the function of a conventional expansion tank is integrated into the buffer tank. This eliminates the need for a separate expansion tank outside of the heat exchanger, providing both cost and space savings. The resilient bladder contains air under pressure and is separated from potable water flowing outside of the bladder. In one aspect of this embodiment, the air pressure in the bladder is adjustable. In another embodiment, the bladder is permanently sealed. As thermal expansion occurs, the excessive pressure generated is pushed against the bladder and absorbed by the bladder. Thermal expansion may be from, for example, heating of the water or from "water hammer" due to a sudden change in water demand or the closed loop heating of the fluid resulting in fluid volume increases.

Increased fin density in a section of the heat coil disposed around the buffer tank ameliorates uneven distribution of heat energy in the heat exchanger coil tubing, inefficient heat transfer from the burner to the water flowing in the coil tubing, thermal stress and premature failure of the heat exchanger. In some aspects of this embodiment, the increased fin density in this portion of the helix coil is coupled with a decreased fin density in another portion of the coil to provide an even hot flue gas flow and heat transfer. In the embodiment depicted in FIG. 2, the fin density along the helix coil tubing is modified to ensure that heat energy is more evenly distributed across the entire length of the helix coil.

An increased diameter in the upper portion of the heat exchanger housing increases the volume of hot flue gas flow held within this section and creates a relatively lower pressure region which encourages the hot flue gas flow from the helix coil lumen towards this region, thereby enhancing convective heat transfer to the helix coil.

The need for a tight fit between the heat exchanger housing and the helix coil is ameliorated with the application of a resilient rope seal between helix coil loops. A high grade stainless steel plate placed circumferentially around the buffer tank and extending to the inner perimeter of the helix coil channels hot flue gas towards the finned helix coil more effectively and deflects excessively hot flue gas from potentially damaging the rope seals.

Isolation of non-heat transferring components from the damaging overheat from the burner is accomplished with a top casting that serves as an interface between the burner and the fan blower so that the fan blower does not come in direct contact with the burner. The air/fuel flow within the top casting aids in recapturing heat loss through the top casting.

A port fitting utilized in making connection between the helix coil ends and external plumbing allows the helix coil to be suspended in the housing. This advantageously allows the helix coil loops to have a uniform pitch and shift as necessary due to expansion and contraction during operation. Uniform pitch overcomes the need for design modifications to accommodate fittings at both ends of the helix coil since the fittings are designed to be disposed within the inner diameter of the helix coil ends.

Along with the discovery of various primary and supplementary water heating methods, there arises a need to combine various sources of heat source into a single unit to realize the advantage of space and cost saving. Combining various heat sources into one system enables the various heat sources to be controlled by a single controller making it possible to optimize the energy output of these heat sources.

In one embodiment, an electric heating element capable of providing fine modulated heat output is submerged in the buffer tank and comes in direct contact with the fluid flowing through the buffer tank. In addition to providing fine modulated heat output, the additional heat source can be used to supply a substantial portion of a large hot water demand in conjunction with the radial-fired burner.

In another embodiment, the heat exchanger system comprises a solar heating system to provide supplemental heat. The solar heating system comprises a solar energy collector thermally coupled to a heat-transfer fluid which is circulated in a solar heat tubing using a pump and a solar heat exchanger disposed inside the buffer tank such that the solar energy harnessed by the heat-transfer fluid via the solar energy collector is transferred to the buffer tank flow via the solar heat exchanger. Incorporating the solar heat exchanger within the buffer tank eliminates the need for a separate tank and reduces the space required, realizing a more compact design.

In yet another embodiment, a radial-fired burner heat exchanger system can be adapted to comprise a Stirling engine in order to form a combined heat and power unit.

DETAILED DESCRIPTION OF A PREFERRED EMBODIMENT

Figure 1A:
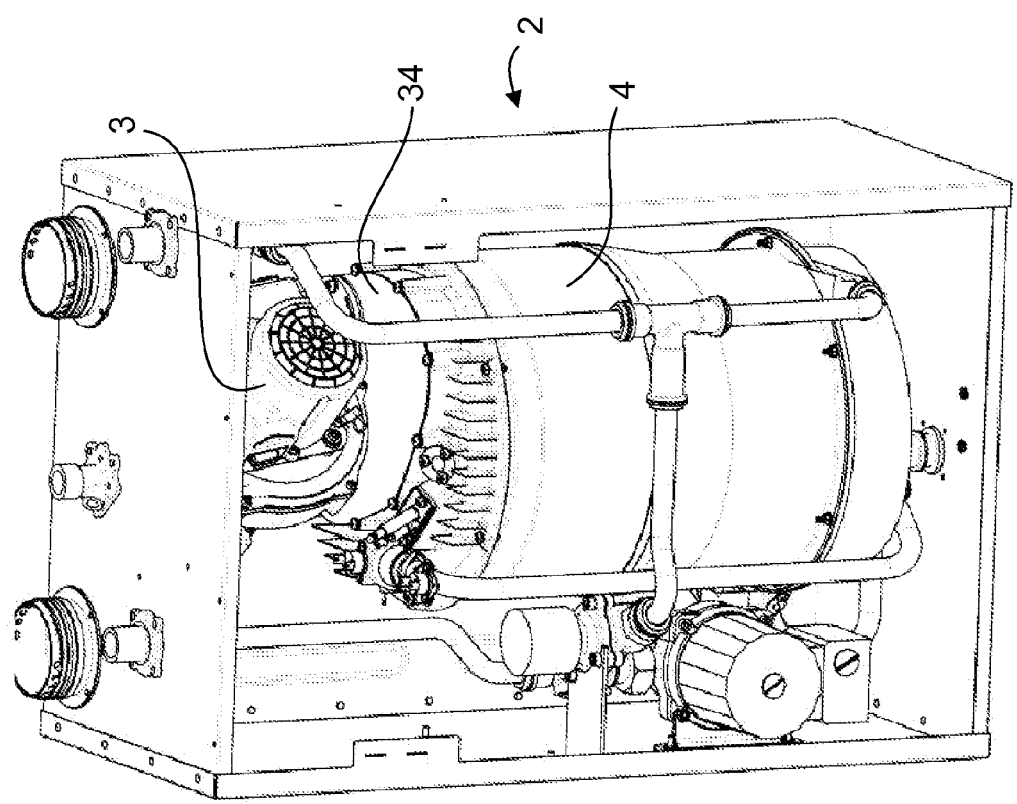
FIG. 1A is a top front perspective view of a hot water system including a heat exchanger.
Figure 2:
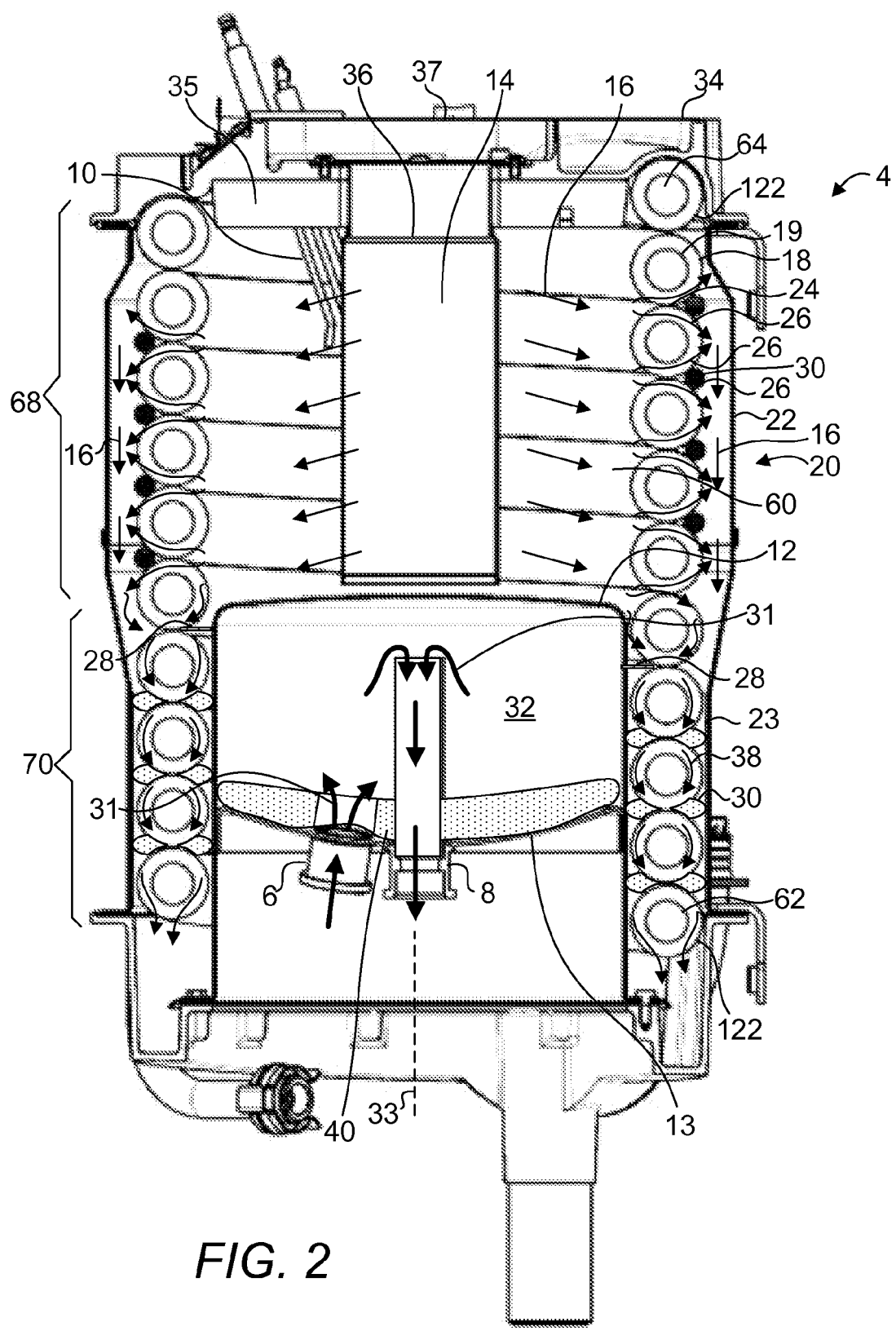
FIG. 2 depicts a front orthogonal cross sectional view of the heat exchanger of FIG. 1B.

FIG. 1A is a top front perspective view of a hot water system including a heat exchanger 4. In use, the heat exchanger 4 receives a forced air/fuel mixture flow from a fan blower 3 connected to the heat exchanger 4. FIG. 1B is a front orthogonal view of the hot water system of FIG. 1A. FIG. 2 depicts a front orthogonal cross sectional view of the heat exchanger of FIG. 1B. The detailed description which follows describes the flow of water in the heat exchanger in the context of a tankless hot water system to aid in understanding of the inventive concept in one embodiment of its application. It is to be appreciated, however, that other fluids may be heated, such as for example, ethylene glycol in hydronic heating.

Referring to FIG. 2, the heat exchanger 4 comprises a top casting 34 and a finned helix coil 18 housed in a variable diameter cylindrical stainless steel housing 20. The housing 20 comprises a generally cylindrical wall, a lumen, an upper opening and a lower opening. A radial-fired burner 14 and a cylindrical buffer tank 32 are disposed axially and concentrically with the housing 20 inside the lumen of the finned helix coil 18. One or more igniters 10 are disposed in close proximity to the burner 14 for the purpose of igniting an air/fuel mixture received in the burner 14. In use, cold water is moved from the helix coil inlet port 62 at an end coil loop 122 through the helix coil 18 and out through the helix coil outlet port 64 at another end coil loop 122. In one embodiment, the helix coil outlet port 64 is connected to a buffer tank inlet port 6.

In the embodiment shown, the buffer tank 32 has a bottom end wall 13 and a top end wall 12. The buffer tank inlet port 6 is mounted at the bottom end wall 13 of the buffer tank 32. In certain other configurations, the outlet tube 8 of the buffer tank is connected to the helix coil input port 62 via well-known operational configurations comprising components such as a pump, solenoid valve, check valve, pipe "T," and the like. A buffer tank is commonly used in a tankless hot water system and serves as a reserve supply of warm water to ease excessively cold or warm water during operational transience.

In another embodiment, there are provided baffles or a barrel-hole style inlet system (not shown) for creating turbulence and promoting mixing of the incoming water with existing water in the buffer tank 32. In yet another embodiment, effective mixing is provided by a combination of right angle configuration of the buffer tank inlet port 6 and internal buffer tank baffles and/or baffles of a barrel-hole style system.

In the embodiment depicted in FIG. 2, the buffer tank inlet port 6 is disposed at a location lower than the opening of the buffer tank outlet tube 8. The outlet tube 8 is preferably a riser extending through the bottom end wall 13 at substantially the central longitudinal axis 33 of the buffer tank to a point substantially close to the top end wall 12 of the buffer tank 32. Such configuration prevents air bubbles from forming in the buffer tank 32 and ensures a uniformly distributed heated water supply. It also facilitates filling of the buffer tank and maximizes the storage capacity of the buffer tank. The large separation of the outlet tube 8 opening and the inlet port 6 promotes mixing of incoming water with existing water in the buffer tank 32. The positioning of the outlet tube 8 in an area without localized boiling ensures that the outlet flow is thoroughly mixed and the output water is not at boiling temperature.

A normally plugged drain port may also be provided to ease emptying of the buffer tank for transport or when not in use. In the present invention, the inlet port 6 alternatively functions as a drain since it is disposed at a low elevation in the buffer tank to facilitate gravitational drainage.

In use, a fan blower 3 (FIGS. 1A and 1B) is connected to the inlet port of the top casting 34. Within this top casting 34, an uncombusted flow of air/fuel mixture is channeled through its cavity to aid in removing excessive heat from the cavity of the top casting 34. Details of the mechanism for enhancing the removal of excess heat is described elsewhere herein. A thermal insulator 35 is disposed between the top casting 34 and the burner 14 in order to prevent overheat of the top casting 34. The air/fuel mixture is then fed to the burner 14 where combustion takes place. As combustion occurs, hot flue gas is generated and subsequently dispersed by newly admitted air/fuel mixture at the burner to surround the helix coil tube and carried from the upper opening to the lower opening of the heat exchanger housing 20 in directions 16 and 38.

An increased diameter section 22 is formed in the cylindrical wall of the heat exchanger housing 20 to provide additional space to encourage hot flue gas flow to the space defined by the outer perimeter of the helix coil 18 and the inside surface of the housing 20. Increased hot flue gas flow around helix coil causes increased heat transfer rate to the water flow in the helix coil. As shown in FIG. 2, with the aid of the fan blower 3 (FIGS. 1A and 1B), the hot flue gas penetrates the gaps 24 between consecutive helix coil loops to reach surfaces of the helix coil on the outer perimeter of the helix coil 18. The hot flue gas flow is provided in the direction opposite that of the general water flow direction in the helix coil 18 in order to maximize heat transfer to the water. As the hot flue gas travels toward the lower end of the heat exchanger housing 20 as it leaves the burner, the hot flue gas is forced to surround the second section 70 which surrounds the buffer tank 32. At section 22, the diameter of the housing lumen is preferably, but not limited to, at least 5% larger than the normal diameter of the housing at section

23. In a more preferred embodiment, the section 22 to section 23 diameter ratio ranges from about 1.05 to 1.15.

Referring again to FIG. 2, heat transfer from the hot flue gas to the water flowing in the helix coil tube is further enhanced by disposing rope seals 30 between helix coil loops in a second section 70, i.e., the helix coil loops surrounding the buffer tank 32. The rope seals 30 can be made of high temperature grade resilient material such as silicone or any suitable insulating material capable to be placed in a high temperature and acidic environment. In the second section 70, a rope seal 30 is secured in place between helix coil loops on the outer perimeter of the helix coil and a second one between helix coil loops on the inner perimeter of the helix coil. In the first section 68, a rope seal is secured in place between helix coil loops on the outer perimeter of the helix coil such that hot flue gas can be forced to surround coil tube en-route from the burner to the increased diameter section 22 of the housing. In the second section 70, the exposed side of the rope seal 30 disposed on the outer perimeter of the helix coil comes in contact with the inside surface of the heat exchanger housing 20 while the exposed side of the rope seal 30 disposed on the inner perimeter of the helix coil comes in contact with the outside surface of the buffer tank 32.

Figure 2A:
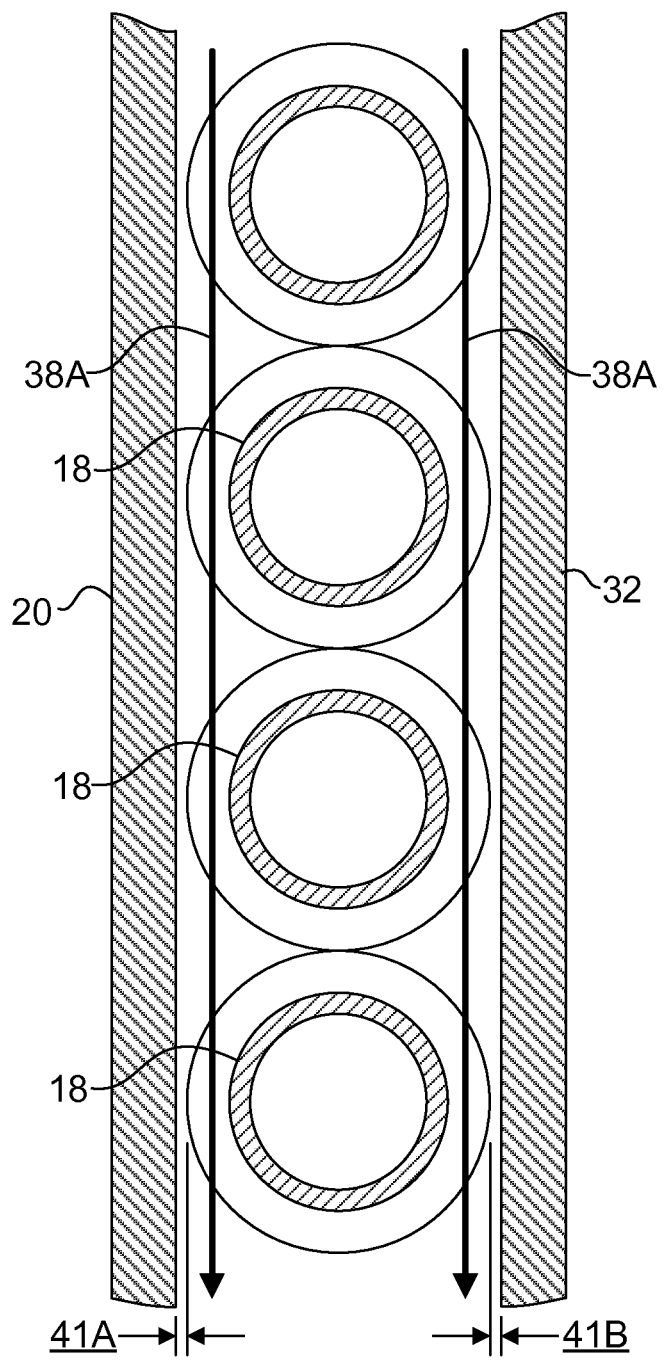
FIG. 2A depicts a partial front orthogonal view of a hot flue gas flow around a helix coil without employing rope seals.
Figure 2B:
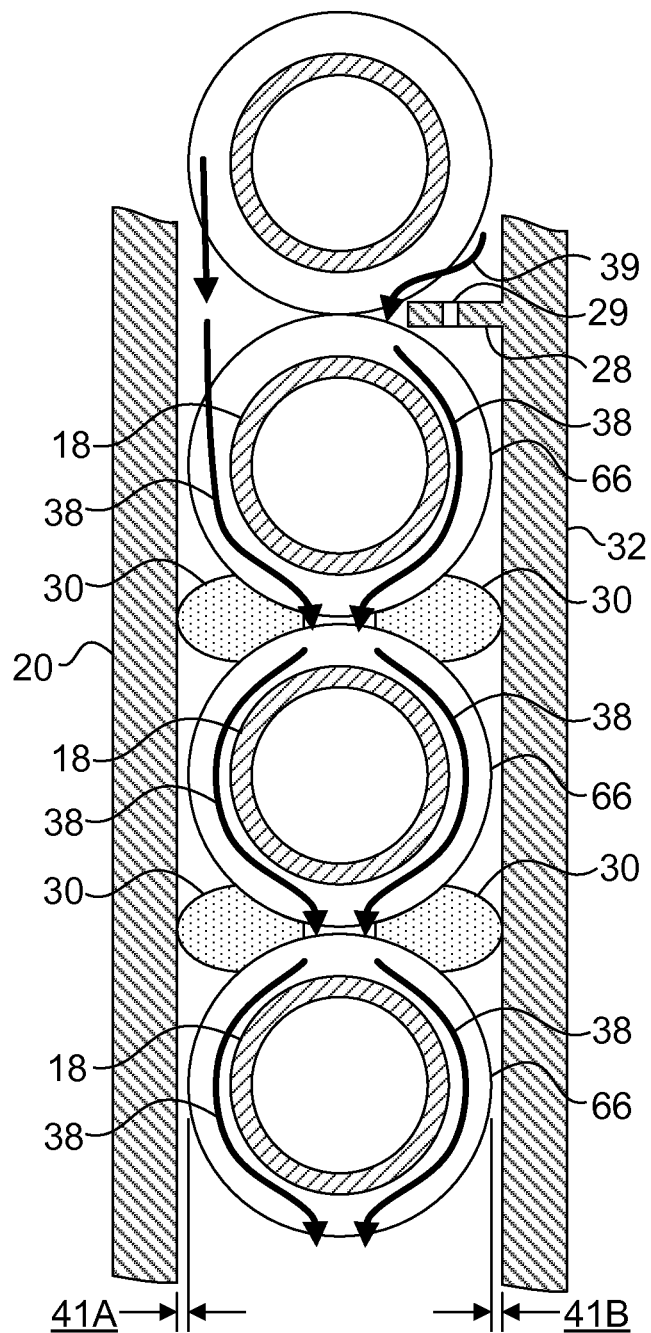
FIG. 2B depicts a partial front orthogonal view of a hot flue gas flow around a helix coil with rope seals and a deflector.

FIG. 2A depicts a partial front orthogonal view of a hot flue gas flow around helix coil loops without employing rope seals. Without rope seals, the hot flue gas flows unimpededly (as shown by direction 38A) through the inner and outer perimeters of the helix coil 18 without circumnavigating the entire exterior surfaces of the helix coil tube, thereby missing opportunities to transfer heat to the helix coil. In one embodiment of the present invention, rope seals are utilized as more clearly depicted in FIG. 2B. FIG. 2B depicts a partial front orthogonal view of a hot flue gas flow around the helix coil with rope seals and a buffer tank 32 mounted deflector 28. By employing rope seals, the hot flue gas no longer flows unimpededly through the inner and outer perimeters of the helix coil 18 but instead circumnavigates the entire helix coil surfaces of the helix coil as shown in direction 38. In the installed state, the rope seals come in contacting engagement with the heat exchanger housing 20 wall and the buffer tank 32 wall, thereby maintaining consistent gaps 41A, 41B. In a conventional hot water system, during the assembly of a helix coil and the buffer tank inside the heat exchanger housing, one must contend with tight tolerances between the interior surface of the heat exchanger housing and the outer perimeter of the helix coil and between the inner perimeter of the helix coil and the outer diameter of the buffer tank. In their compressed and installed form, the unique cross sectional shape of the rope seals 30 help ease installation of the helix coil in the heat exchanger housing by securely holding the helix coil in place without undue tolerances control. A high grade stainless steel deflector 28 is installed upstream of the rope seals 30 in the hot flue gas path to shield rope seals from experiencing excessively hot and damaging hot flue gas.

The top end wall 12 of the buffer tank 32 is preferably formed with a cone shaped surface to deflect condensation which can otherwise collect on this surface. In addition, this shape also enhances the buffer tank shell end strength and avoids corrosion if acidic condensate is allowed to collect on this surface. The natural slope drains the condensate. Drainage is further provided by having apertures 29 in the hot flue gas deflector 28.

In the embodiment depicted in FIG. 2, the buffer tank 32 further comprises an expansion bladder 40 which replaces the need for a separate expansion tank in the hot water system. Expansion tanks are commonly used in hot water systems to accommodate damaging effects of sudden fluid pressure changes due to volume changes.

Referring to FIG. 2, the helix coil 18 further comprises heat transfer fins either formed integrally with the tubing or wound separately onto the helix coil tube 19 and laser welded onto the tube 19. The density of fins 66 may remain constant throughout the entire length of the helix coil 18 or it may be varied. For instance, in order to enhance heat transfer, the density of the heat transfer fins, or effectively the total heat transfer surface area, may be increased at the second section 70 surrounding the buffer tank 32 and decreased at first section 68 which faces the burner. By employing varying fin density and size, heat transfer optimization can be achieved in the heat exchanger. Upon heat transfer to the first section 68, the hot flue gas volume decreases. The increased fin density at the second section 70 operates to increase the hot flue gas velocity, thereby maintaining heat transfer rate across the entire helix coil length.

The helix coil can be viewed as having two sections. Disposed in close proximity to the burner, first section 68 surrounds a radial-fired burner and it receives heat energy from the burner primarily via conduction, convection and radiation. The second section 70 surrounds a non-heat generating component, i.e., the buffer tank, and is disposed farther from the burner and downstream in the hot flue gas flow from the first section 68. The second section 70 receives heat energy from the burner primarily via convection alone. A uniformly distributed fin density along the length of the coil tubing causes a significantly higher heat transfer rate (and hence temperature) in the first section 68. This high temperature gradient between the two sections causes excessive thermal stresses which can result in surface cracks of the helix coil. In the embodiment depicted in FIG. 2, the fin density in the second section 70 can be increased to effect high heat transfer rate since it receives less heat power. The fin density can also be altered to progressively increase from the first section 68 to the second section.

Figure 2C:
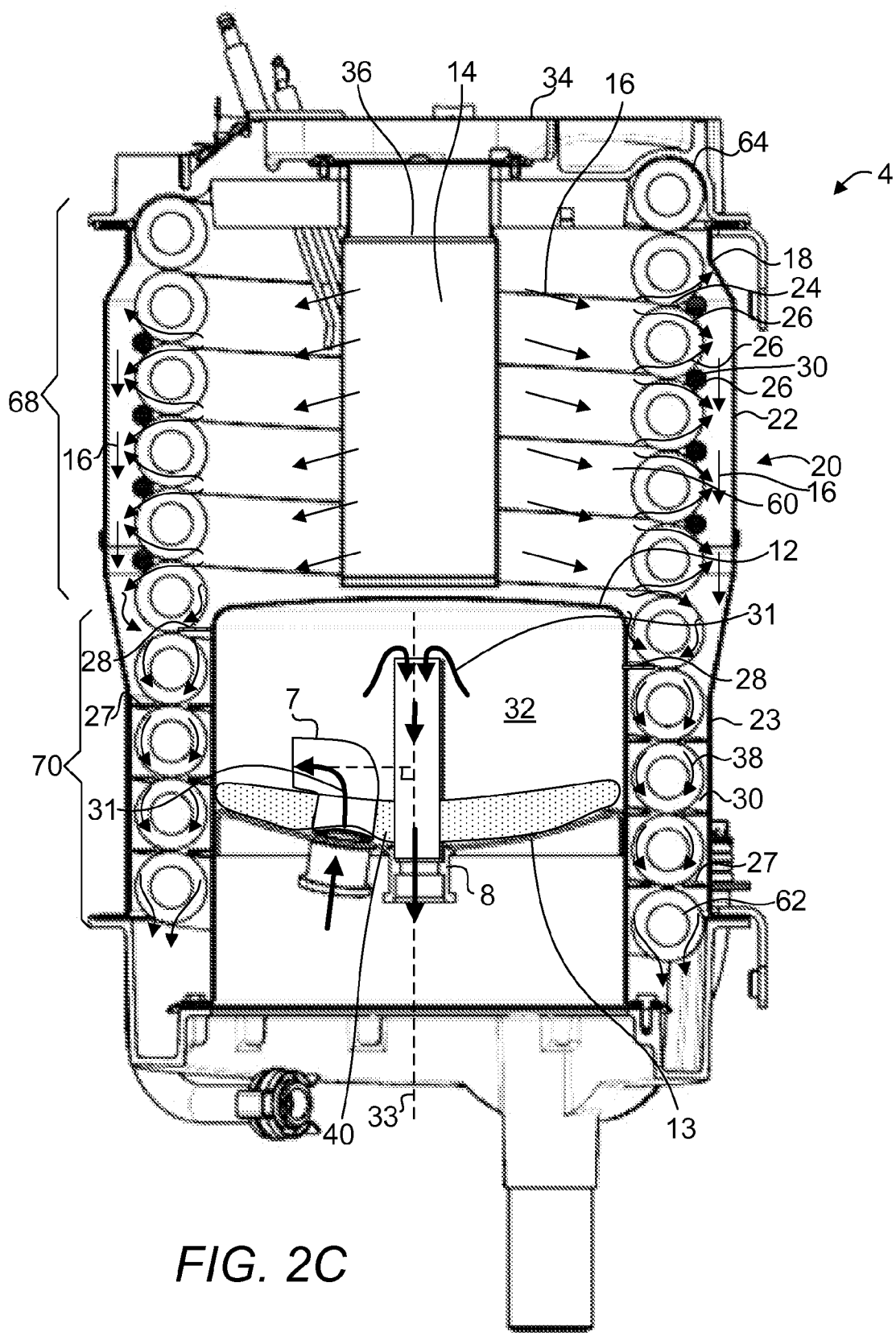
FIG. 2C depicts a front orthogonal cross sectional view of the heat exchanger of FIG. 1B illustrating the use of alternate flue baffle plates for channeling hot flue gas to surround the helix coil loops surrounding the buffer tank.

FIG. 2C depicts a front orthogonal cross sectional view of the heat exchanger of FIG. 1B illustrating the use of alternate flue baffle plates 27 for channeling hot flue gas to surround the helix coil loops surrounding the buffer tank 32. Such flue baffle plates are typically made of curved thin flat stainless steel plates, each having one or more slots along its lengthwise axis for channeling hot flue gas to better surround helix coil loops. FIG. 2C also depicts an alternate configuration of the inlet port of the buffer tank. In this embodiment, the buffer tank inlet port 7 is configured substantially at a right angle to the central longitudinal axis 33 of the buffer tank. This configuration effectively reroutes the incoming water throughout the buffer tank 32 to promote mixing of the incoming water with existing water in the buffer tank 32.

Figure 3:
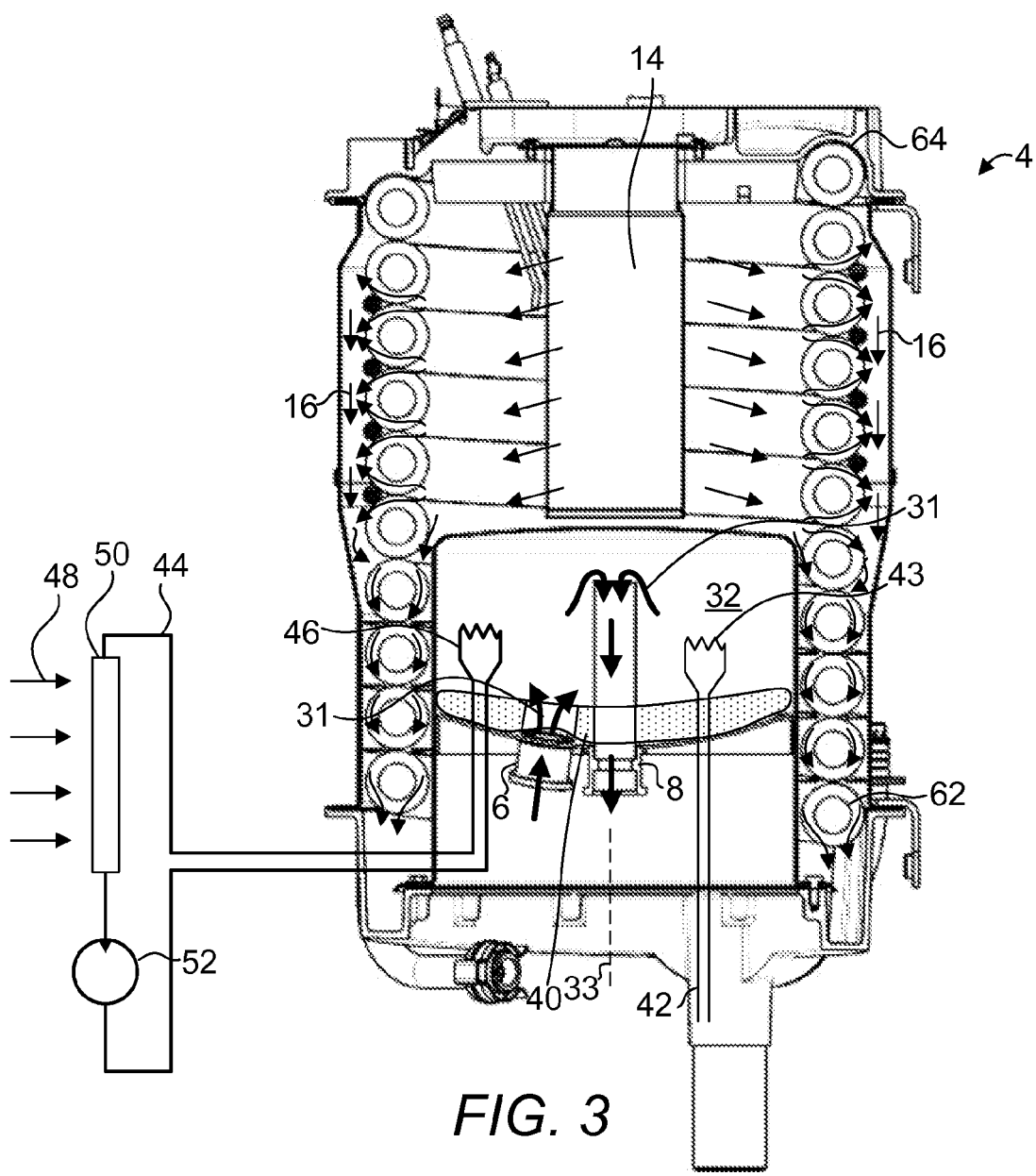
FIG. 3 depicts the heat exchanger of FIG. 2 and an electric heat source and a solar heat source.

FIG. 3 depicts the heat exchanger 4 of FIG. 2 combined with an electric and a solar heat source. In one embodiment, the heat exchanger 4 comprises an electric heating system as an additional heat source. A residential or commercial system may include HVAC heating, radiant floor heating and potable water heating. An electrical heating element 43 capable of providing fine modulated heat output is submerged in the buffer tank and comes in direct contact with the water flowing through the buffer tank 32. In addition to providing fine modulated heat output, the additional heat source can be used to supply a substantial portion of a large hot water demand in conjunction with the burner 14.

In another embodiment, the heat exchanger 4 comprises a solar heating system to provide supplemental heat. In this instance, the solar heating system comprises a solar energy collector 50 thermally coupled to a heat-transfer fluid circulated in a solar heat tubing 44 using a pump 52 and a solar heat exchanger 46 disposed inside the buffer tank 32. In use, solar energy 48 harnessed by the heat-transfer fluid via the solar energy collector 50 is transferred to the buffer tank 32 flow via the solar heat exchanger 46. In yet another embodiment, a combination of radial-fired burner-buffer tank heat exchanger, electric heating element 43 and solar heat exchanger 46 is used as depicted in FIG. 3.

Figure 4:
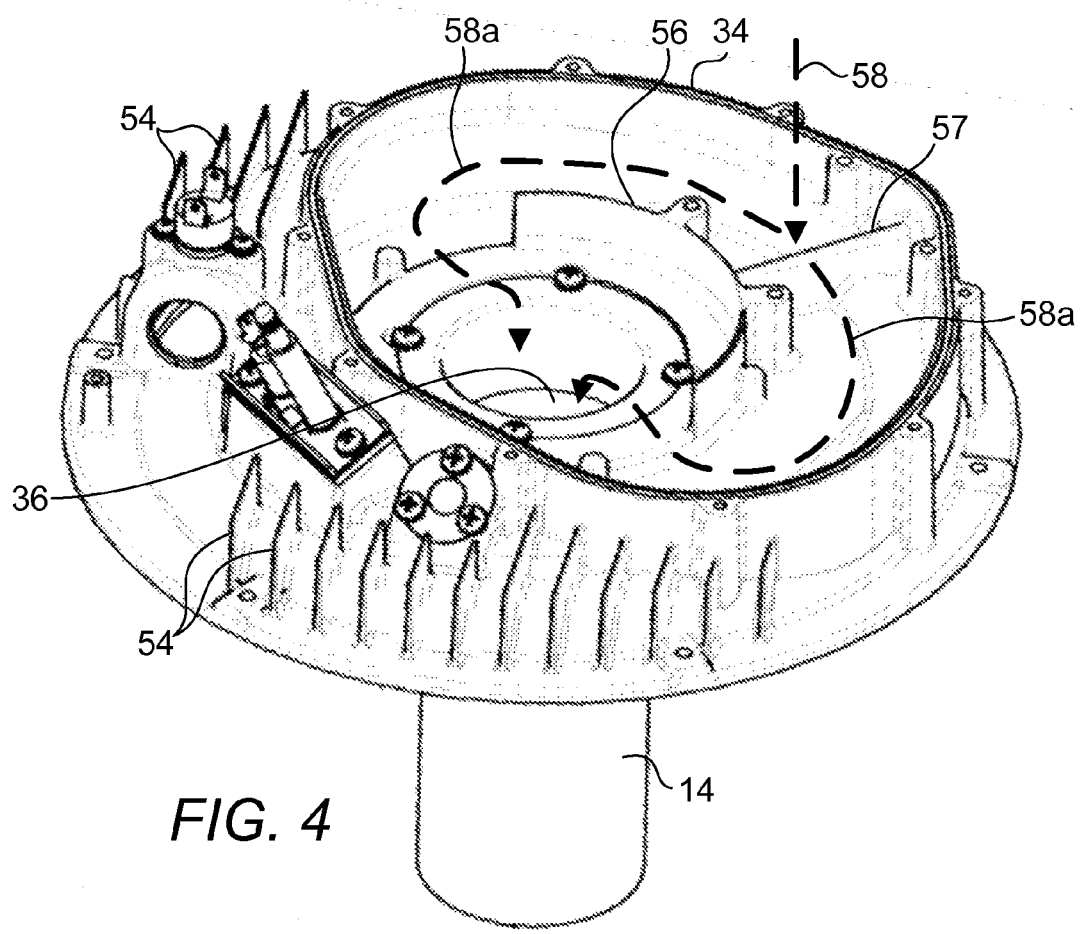
FIG. 4 is a top perspective view of the interior configuration of a top casting illustrating a means by which an air/fuel mixture stream is used to cool the top casting to prevent overheating.

FIG. 4 is a top perspective view of the interior configuration (with the top cover removed) of a top casting 34 illustrating a mechanism by which an air/fuel mixture flow is used to cool the top casting 34 to prevent overheating. The plate on which an air/fuel mixture input port 37 (see FIG. 2) is disposed has been removed to reveal such mechanism. An air/fuel mixture flow 58 is received at the input port 37 of the top casting 34 and subsequently split upon impacting a wedge 57, dividing the incoming air/fuel mixture flow 58 into two flows 58*a*, each encircling a semicircular path defined by a fluid path diverter 56 which eventually leads to an exit port 36. As the air/fuel mixture flows within the top casting cavity, it absorbs combustion heat of the burner escaping through the top casting 34, thereby cooling the top casting 34 down while recovering this otherwise lost heat. With a cooler top casting 34 and more efficient heat recovery, the heat exchanger runs cooler and with lower temperature variations which together reduce cyclic thermal stress and increase the life span of the top casting 34. A series of heat radiating fins 54 is also formed on an exterior surface of the top casting 34 in order to further dissipate heat. The heat exchanger is thus capable of operation in high ambient temperatures and will not overheat other components within the cabinet in which the heat exchanger is disposed.

Figure 5:
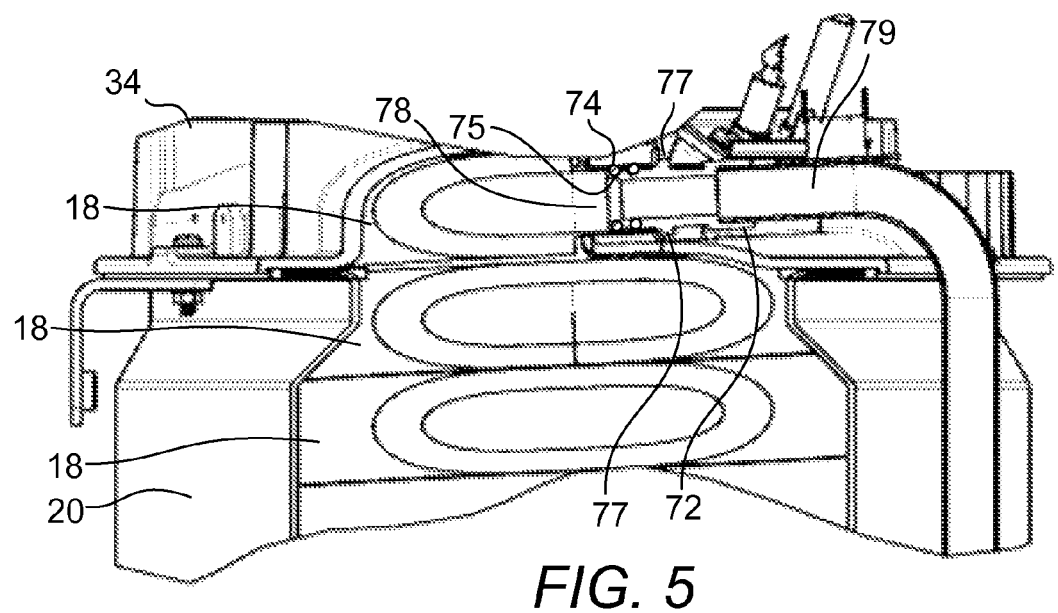
FIG. 5 is a partial front orthogonal cross sectional view of a port fitting connecting a helix coil end to external plumbing.
Figure 5A:
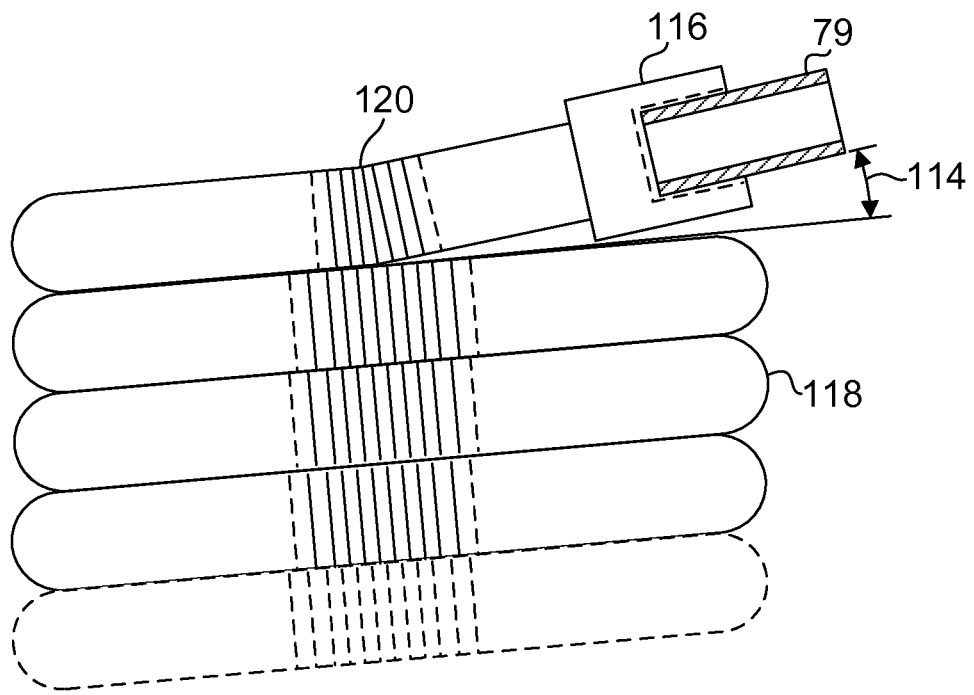
FIG. 5A is a partial side orthogonal view of a helix coil illustrating a means by which a conventional port fitting is attached to a helix coil end.
Figure 5B:
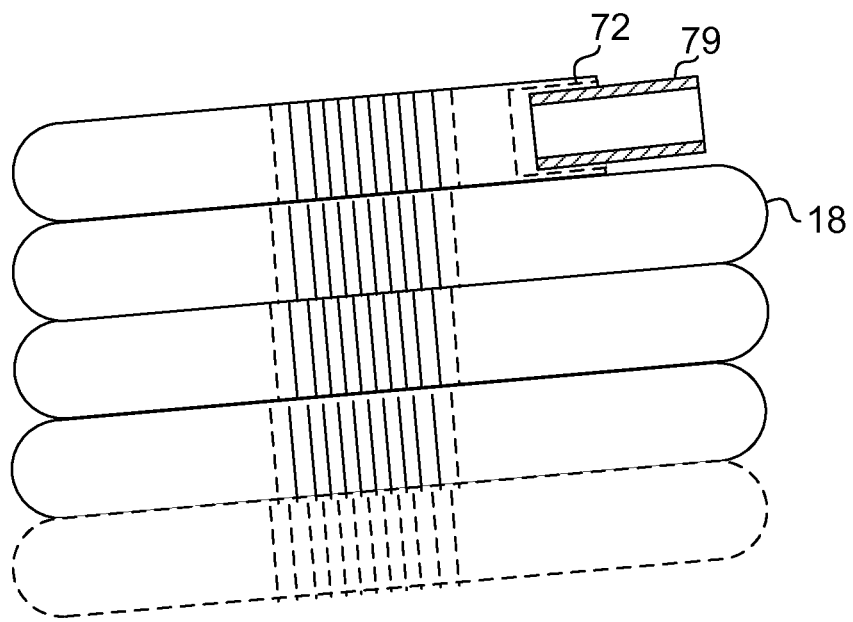
FIG. 5B is a partial side orthogonal view of a helix coil illustrating a means by which a port fitting is attached to a helix coil of the present invention.

FIG. 5 is a partial front orthogonal cross sectional view of a port fitting connecting a helix coil end to external plumbing. The port fitting 72 provides a seal against gas, air and fluid. As depicted, one end of the port fitting 72 having a similarly sized lumen as the helix coil lumen is inserted in the helix coil end lumen and secured in place by friction using O-rings 74 compressed against the inner surface of the coil and fitted over circumferential grooves 75 formed in the port fitting 72. A circumferential securing flange 77 formed on the exterior surface of the port fitting 72 prevents the port fitting 72 from detaching from the helix coil end. An external tubing 79 is typically soldered or friction fit onto a second end of port fitting 72. Friction fit between the helix coil end and the port fitting 72 enables the helix coil to suspend freely and accommodates cyclic thermal changes and external forces in the helix coil without causing damage. A similar port fitting is used on the opposite end of the helix coil. The advantages of the present port fitting are readily appreciated by referring to FIGS. 5A and 5B. FIG. 5A depicts a conventional means of attaching a port fitting to a helix coil end. FIG. 5B illustrates the means by which a port fitting is attached to a helix coil of the present invention. In a conventional configuration as depicted in FIG. 5A, an external fitting 116 is secured over a helix coil end such that an external tubing 79 can be connected to the helix coil 118. The requirement of securing an external fitting 116 over the helix coil 118 necessitates a bend 120 to be made to the helix coil end to accommodate the external fitting 116. FIG. 5B depicts a port fitting 72 secured instead inside a helix coil end such that an external tubing 79 is attachable to the helix coil end without requiring a bend 120 such as one depicted in FIG. 5B.

Figure 6:
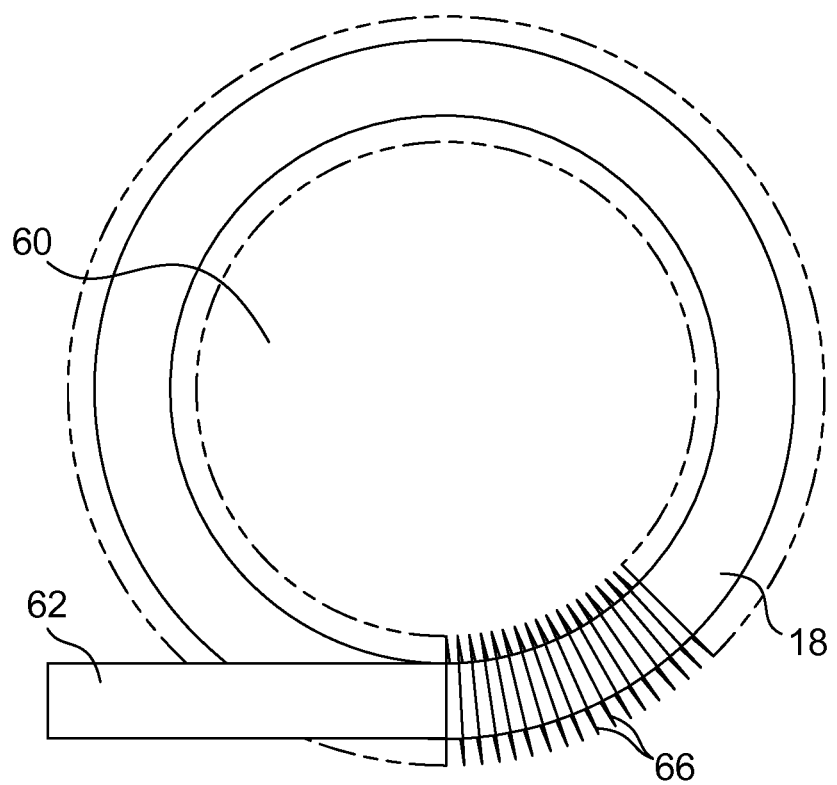
FIG. 6 is a bottom view of the helix coil of FIG. 2.

FIG. 6 depicts a bottom view of the helix coil of FIG. 2 illustrating fins around the helix coil. The helix coil lumen 60 is shown and fins 66 are wound around the entire length of the helix coil 18.

Figure 7:
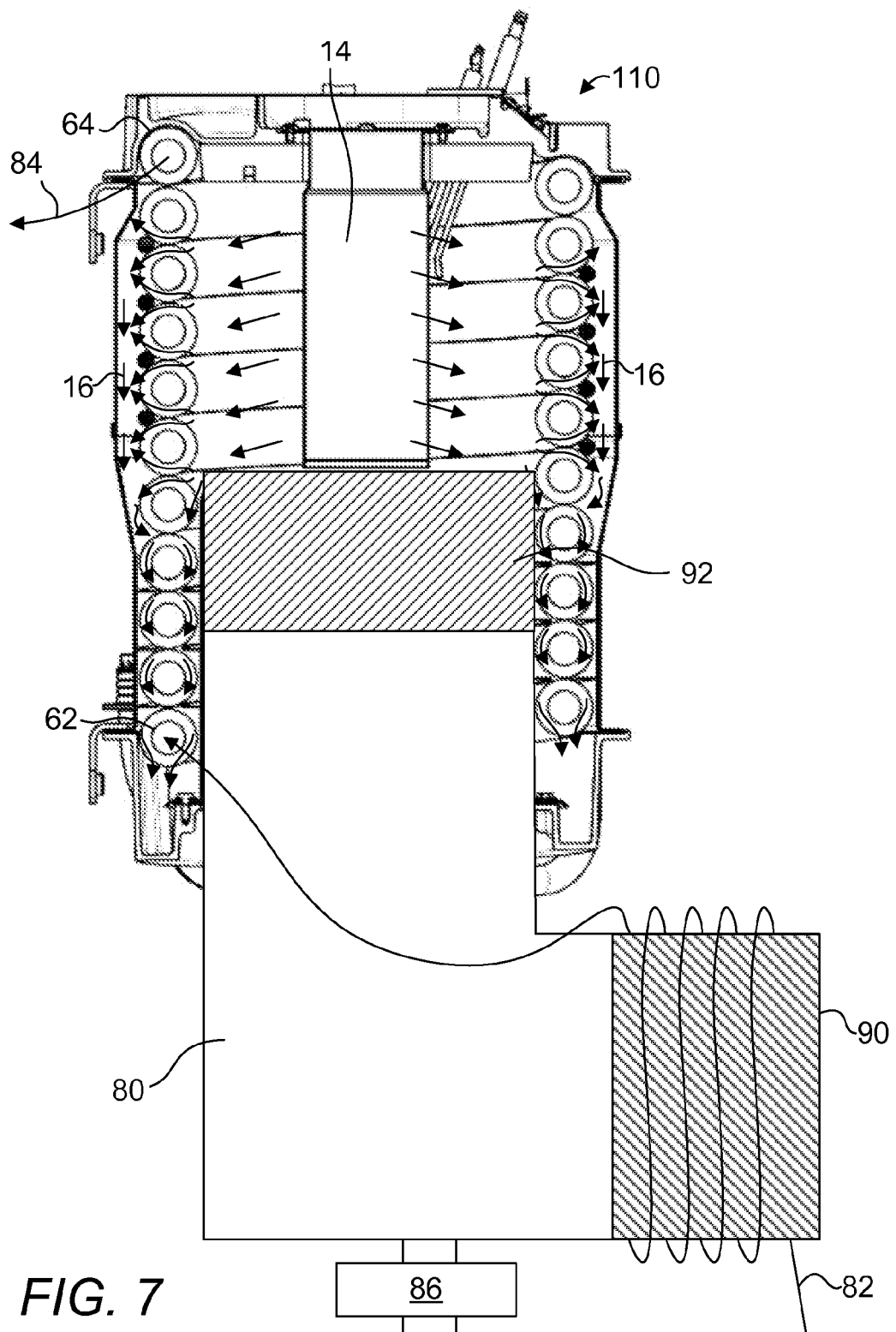
FIG. 7 is an embodiment of a combination hot water and electricity generator using a combined single burner heat exchanger and Stirling engine.

FIG. 7 is an embodiment of a combined heat and power system 110 using a combined single burner heat exchanger and Stirling engine. A similar single burner heat exchanger is used as in FIG. 2. However, the space occupied by the buffer tank of FIG. 2 is replaced with a Stirling engine 80. A Stirling engine requires a temperature differential to convert fuel energy to electricity. A free piston with a hot end and cold end is used. The hot end 92 of the Stirling engine 80 receives heat from the heat exchanger (as well as direct radiation and convective heat from the burner) while the cold end 90 is cooled via conduction by the incoming cold water supply line 82 that is brought into thermal contacting engagement with the cold end. The cold water supply line is coiled around the cold end of the Stirling engine 80 in order to drop its temperature.

When there is a demand for hot water, the burner is started and begins heating up water in the helix coil. In the process, combustion also heats up the hot end 92 of the Stirling engine 80. The cold end 90 of the Stirling engine is cooled by the incoming cold water to maintain the cold end at a lower temperature. The process of cooling the cold end 90 causes the incoming water to be preheated prior to entering the helix coil to be further heated by the heat exchanger. The differential temperature between the hot end 92 and the cold end 90 moves a free piston and a linear rotor causing electricity to be generated. In some aspects of this embodiment, electric power electronics 86 further converts the generated electricity into alternating current or adjusts the phase to correlate with power requirements of the home or utility power grid 88. If the electrical energy exceeds consumption, then the electricity can be fed back to utility grid via power electronics.

Figure 8:
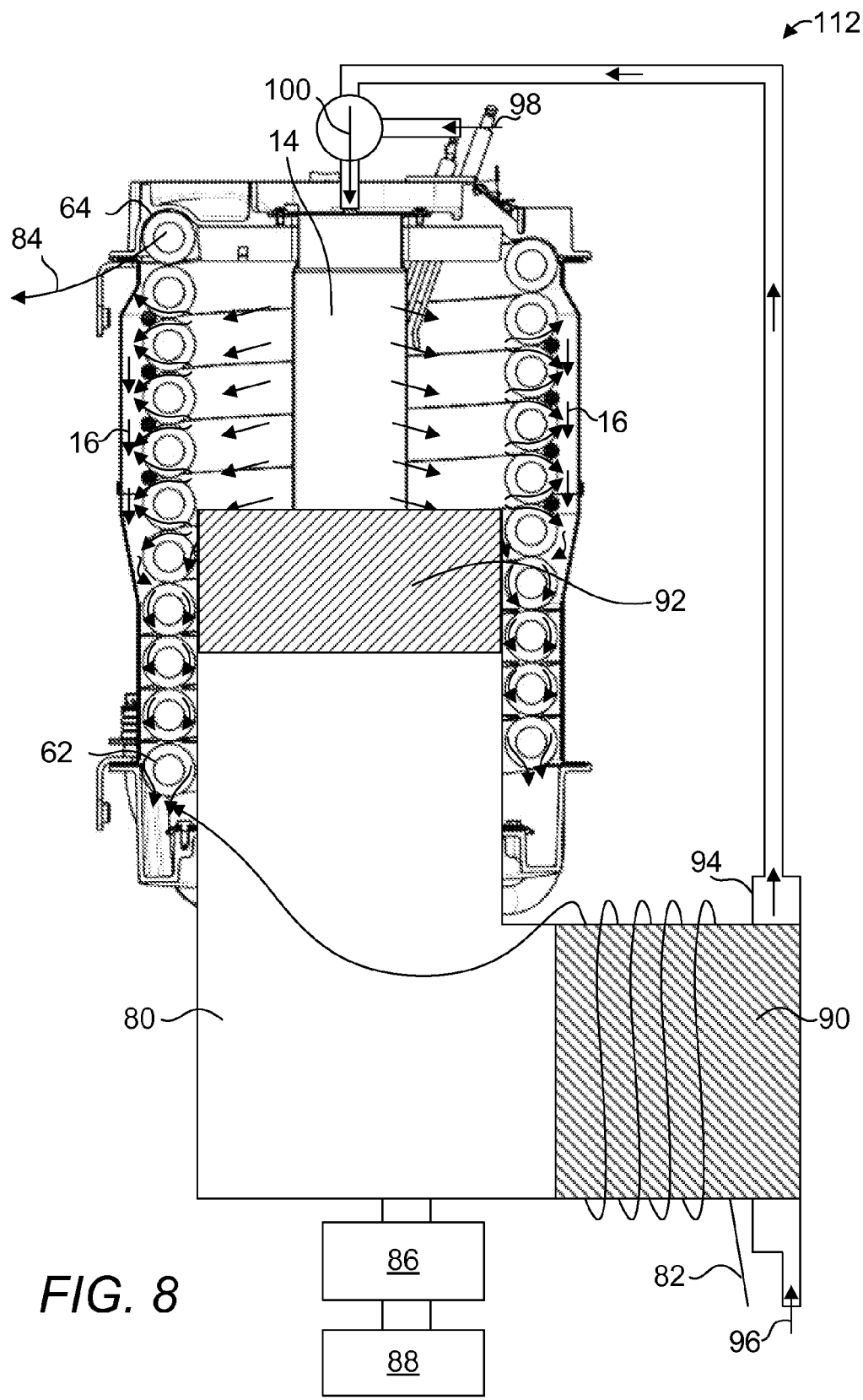
FIG. 8 is an embodiment of a combination hot water and electricity generator using an improved combined single burner heat exchanger and Stirling engine.

FIG. 8 is another embodiment of a combined heat and power system 112 using an improved combined single burner heat exchanger and Stirling engine. Since electricity generation is directly proportional to the temperature differential between the hot end 92 and the cold end 90 of the Stirling engine 80, this improved combined heat and power system 112 features a further cooled cold end 90. In this embodiment, the cold end 90 of the Stirling engine 80 is cooled further by flowing ambient air 96 in a flow chamber 94 shrouded over the cold end 90. This flow of ambient air becomes preheated upon absorbing heat from the cold end 90 and proceeds to be mixed with fuel 98 to form air/fuel mixture 100 which then empties into the burner 14.

What is claimed herein is:

1. A heat exchanger comprising:
   (a) a generally cylindrical housing comprising a cylindrical wall having an upper section and a lower section, an upper opening, a lower opening, a lumen, and a central longitudinal axis, wherein said lumen connects said upper opening to said lower opening;
   (b) a generally cylindrical burner comprising an open upper end, a closed lower end and a cylindrical wall connecting said open upper end and said closed lower end, wherein said cylindrical wall comprises a plurality of regularly spaced apart apertures;
   (c) a helix coil comprising a plurality of coil loops defined by a first coil section, a second coil section and two end coil loops wherein each of said two end coil loops is terminated with an inlet port or an outlet port, a plurality of heat transfer fins, an inner perimeter, an outer perimeter, an external helix coil diameter, a central longitudinal axis and a lumen, wherein said plurality of heat transfer fins are placed in thermal contacting engagement with said plurality of coil loops and said two end coil loops and an offset is disposed between adjacent coil loops to leave space between adjacent coil loops; and (d) at least one rope seal having an uncompressed cross-sectional shape that is substantially round, said at least one rope seal is configured to be disposed on at least a portion of said helix coil between adjacent coil loops, reducing the space between adjacent coil loops to result in reduced openings between said adjacent coil loops, wherein said inlet port of said helix coil receives incoming cold water and outputs heated water via said outlet port of said helix coil, said external helix coil diameter is substantially the same as the diameter of said lumen of said housing, said helix coil is disposed within said housing such that said central longitudinal axis of said helix coil is substantially collinear to said central longitudinal axis of said housing, said first coil section substantially surrounds said burner, and said first coil section is disposed atop said second coil section and flue from said burner is configured to flow through said reduced openings to more effectively impinge upon said adjacent coil loops and heat transfer fins of said adjacent coil loops.

2. The heat exchanger of claim 1, wherein said housing comprises variable diameters along its length, whereby said upper section comprises an increased diameter so that a diameter ratio of said upper section to said lower section ranges from about 1.05 to about 1.15.

3. The heat exchanger of claim 1, further comprising a port fitting having at least one seal about a portion of its exterior surface, said port fitting is capable of being inserted in its entirety in a lumen of each of said two end coil loops, wherein plumbing external to said helix coil is connected, said at least one seal seals against leakage between the plumbing external to said helix coil and said helix coil and said port fitting is capable of relative movement with respect to said each end coil loop.

4. The heat exchanger of claim 1, further comprising a top casting for receiving an incoming air/fuel mixture flow, said top casting comprising an inlet port, an exit port and a cavity for containing said incoming air/fuel mixture flow from said inlet port to said exit port, wherein said exit port of said top casting is fixedly secured to said open upper end of said burner and said top casting is fixedly secured to said upper opening of said housing.

5. The heat exchanger of claim 4, said top casting further comprising at least one fluid path diverter for transferring excess heat from said top casting.

6. The heat exchanger of claim 4, said top casting further comprising at least one heat radiating fin for removing excess heat from said top casting to the surrounding environment of said top casting.

7. The heat exchanger of claim 1, wherein each of said two end coil loops possesses substantially the same angle as its adjacent coil loop.

8. The heat exchanger of claim 1, wherein the density of said plurality of heat transfer fins of said helix coil varies across at least a portion of the length of said helix coil.

9. The heat exchanger of claim 1, wherein said at least one rope seal is made of high temperature grade resilient material.

* * * * *